United States Patent Office 3,144,748
Patented Aug. 18, 1964

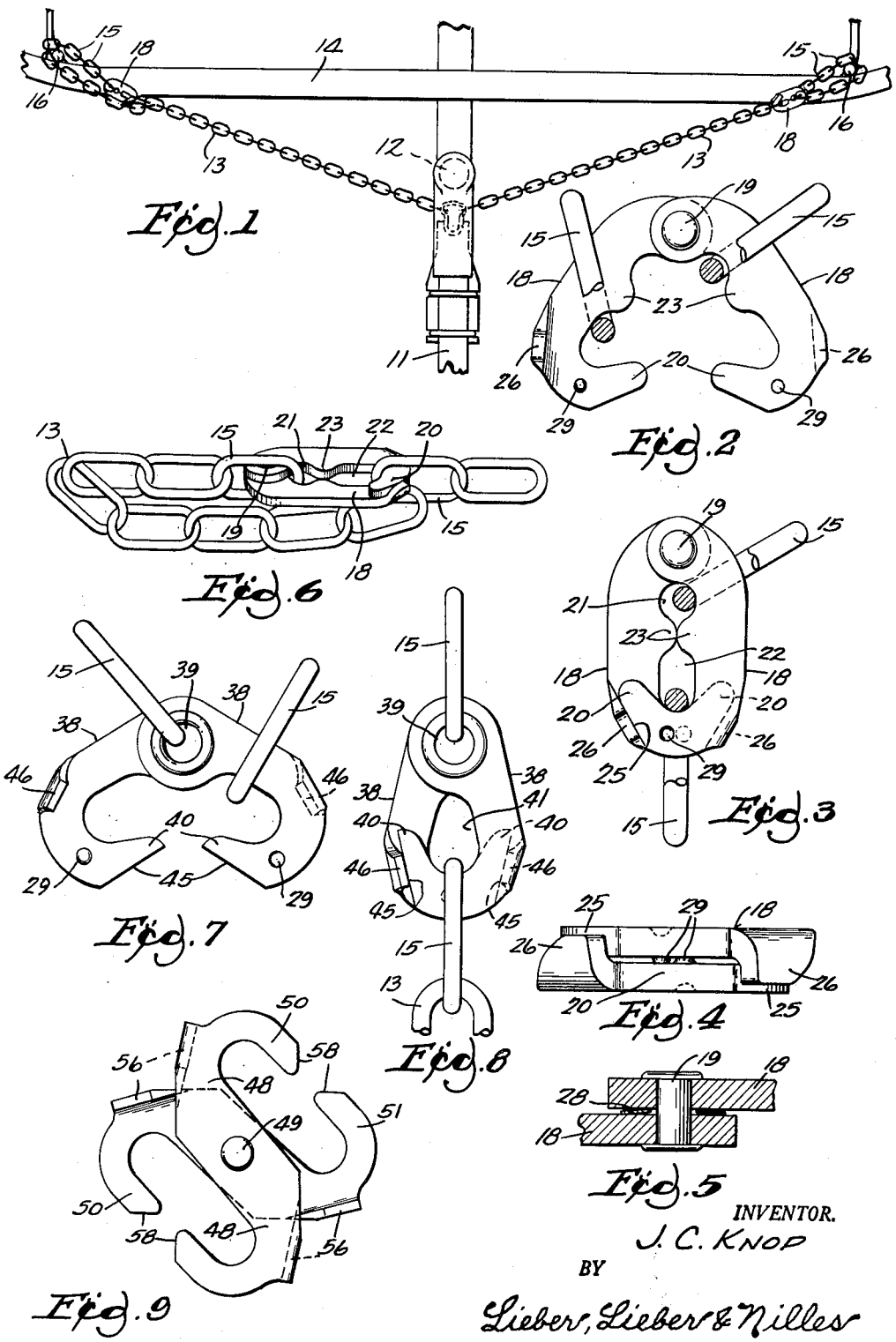

3,144,748
CHAIN HOOK ASSEMBLAGE
James C. Knop, Milwaukee, Wis., assignor to The Fulton Company, a corporation of Wisconsin
Filed Aug. 21, 1961, Ser. No. 132,810
3 Claims. (Cl. 59—88)

The present invention relates generally to improvements in devices for interconnecting the adjacent links of chains, and it relates more specifically to an improved chain hook assemblage.

The primary objects of the present invention is to provide a chain hook assemblage for interconnecting adjacent links of chains used for diverse purposes in a most effective manner.

Many states now require the use of so-called safety chains for connecting trailers to their hauling vehicles independently of the main transporting couplings so that these chains will maintain a draft connection in case the main coupling breaks or becomes otherwise inactive. These safety chains are usually applied in sagging condition between the draft tongue of the trailer rearwardly of the main coupling, and the opposite ends of the rear bumper or frame of the transporting vehicle whereby the chains will assume the pull and will prevent the trailer from becoming detached if the main coupling fails.

While the idea of utilizing such safety chains is feasible, the prior modes of applying and attaching the chain ends to the draft vehicle are all objectionable either because they are too complicated and difficult to apply, or because the attaching means lack sufficient strength to prevent disruption and release when excessive pull is applied as when the chains are subjected to sudden shock while turning corners or the like.

It is therefore an important and more specific object of the present invention to provide a simple and conveniently applicable hook device especially applicable to trailer safety chains and which more fully complies with the laws of the states requiring such chains.

Another important object of this invention is to provide a durable chain hook adapted to be readily applied between adjacent links of diverse sizes of chains which may be subjected to considerable pull, and in which the hooks are formed and cooperate to most effectively resist abnormal forces.

A further important object of the invention is to provide an improved safety chain accessory adapted to be formed primarily of sheet metal with the aid of simple punches and dies and in various sizes for diverse uses at moderate cost.

Still another important object of the present invention is to provide an improved connecting unit insertable between adjacent or successive links of standard chains to firmly unite the same, and which can be easily applied to or released from the chain links and also retains these links properly spaced from each other.

These and other more specific objects and advantages of the invention will be apparent from the following description.

A clear conception of the features constituting the present improvement, and of the construction and operation of several types of chain hook assemblages embodying the invention, may be had by referring to the drawing accompanying and forming a part of this specification and wherein like reference characters designate the same or similar parts in the various views.

FIG. 1 is a diagrammatic top view of a trailer draft assembly showing an ordinary ball and socket main coupling connecting the trailer tongue with the rear of a hauling vehicle, and also disclosing the usual location of a pair of safety chains interconnecting the trailer with the opposite sides of the rear of the vehicle;

FIG. 2 is a plan view of one of the improved assemblages adapted to provide a double loop for spacing the adjacent interconnected chain links from each other, but showing the hooks in separated or open position;

FIG. 3 is another plan view of the same assemblage but showing the hooks in closed position, and the interconnected chain links spaced apart within the double loop;

FIG. 4 is an enlarged end view of the assemblage shown in FIG. 3, showing the position of the staggered holding lugs assumed when the hooks are closed;

FIG. 5 is an enlarged transverse section taken through the pivot of the same assemblage, along the line 5—5 of FIG. 3;

FIG. 6 is a perspective view of the hook assemblage of FIGS. 2 to 5 inclusive, showing the same applied to the vehicle end of a safety chain;

FIG. 7 is a plan view of a modified single loop chain hook assemblage, showing the hooks in open or separated position;

FIG. 8 is another plan view of the assemblage of FIG. 7, but showing the hooks closed and applied to adjacent chain links; and FIG. 9 is a plan view of a further modified chain hook assemblage embodying four hooks, and showing the hooks in separated or open position.

While the improved chain hook assemblage has special utility when used in conjunction with the safety tow chains of a trailer, the novel features may obviously be advantageously utilized in other types of chains; and it is also contemplated that specific descriptive terms employed herein be given the broadest possible interpretation consistent with the disclosure.

Referring to FIG. 1 of the drawing, the trailer draft assembly shown therein comprises in general a trailer tongue 11 having its forward end detachably connected to the rear portion of an automobile or other transporting vehicle by means of a ball and socket main coupling 12; and a pair of forwardly and outwardly extending loosely sagging safety chains 13 interconnecting the tongue 11 rearwardly of the coupling 12 with the rear vehicle body or bumper 14 near the opposite sides of the draft vehicle. These safety chains 13 are usually formed of a series of standard elliptical links 15 and have their front ends looped about structural elements 16 rigidly attached to the rear opposite sides of the vehicle frame or to the bumper 14, and the chains 13 are only subjected to pulling forces when the main coupling 12 breaks or becomes accidentally detached while the trailer is being hauled, but it is desirable to provide the free outer end of each chain loop with a hook assemblage for connecting this end link of the loop to the chain 13 rearwardly of the looped end.

As shown in FIGS. 2 to 6 inclusive, the improved chain hook assemblage for thus connecting each safety chain end to the chain 13 rearwardly of the end loop may comprise, a pair of interchangeably similar members 18 swingably interconnected at their corresponding ends by a pivot 19 and each having an integral hook 20 at its opposite swinging end adapted to overlap the hook of the other member 18 to provide a loop consisting of spaced sockets or openings 21, 22 separated by oppositely directed projections 23 formed on the medial portions of these members, when the hooks 20 are overlapped or closed as in FIG. 3, so as to prevent the interconnected links 15 from becoming jammed.

Each of the hook members 18 is also provided with an inclined rectilinear edge 25 at one side and with an oppositely inclined upstanding abutment 26 at its opposite side. These edges 25 and abutments 26 are disposed near the hooks 20 of the respective members 18 and when these hooks are overlapped as in FIG. 3, the edge 25 of each member 18 snugly engages the adjacent abutment 26 of the other and the two edges 25 are inclined toward each other in a direction receding from the pivot 19 of the assemblage. In this position, the two relatively inclined abutments 26 also cooperate to form a wedge shaped structure with which the edges 25 cooperate and when a longitudinal pull is applied to the chain 13 with which the chain hook assemblage cooperates, the inclined abutments 26 coact with the adjacent similarly inclined hook edges 25 and serve to effectively reinforce the hook portions 20 and aid in preventing the same from bending or distorting under pressure applied through the chain.

In order to cause the hooks 20 to assume the initial overlapped position with a snap action, a resilient or spring washer 28 may be interposed around the pivot 19 between the interconnected adjacent hook ends as shown in FIG. 5, and the hooks 20 may also be provided with lugs 29 which are adapted to pass each other and to assume staggered positions when the hooks are overlapped as depicted in FIG. 4. The spring washer 28 is placed under sufficient compression to stabilize and maintain proper resistance to movement of the two members 18, while the lugs 29 momentarily spread the flat hooks apart laterally while passing each other and thereafter snap into staggered position so as to prevent free opening or separation of the hooks 20 by swinging about the pivot 19.

During normal use of the chain hook assemblage shown in FIGS. 2 to 6 inclusive, the hooks 20 may be swung apart in opposition to the frictional resistance of the spring washer 28 as in FIG. 2 whereupon selected elliptical links 15 of the chain 13 may be applied to the two hooks so as to cause these links to be seated within the spaced sockets formed on the members 18 by the projections 23. By thereafter swinging the hooks 20 about the pivot 19 toward overlapping position as in FIG. 3, the oppositely off-set lugs 29 will pass each other in substantially the same plane with a snap action due to the fact that the members 18 are maintained in close face-to-face proximity while being stabilized by the spring washer 28 surrounding the pivot, and when the hooks are finally overlapped the inclined edges 25 will be held into snug engagement with the similarly inclined adjacent abutments 26 while the lugs 29 will be staggered and maintained in frictional engagement with the adjacent hooks 20 by reason of the stabilizing effect of the resilient washer 28. The two chain links 15 will then be spaced from each other within the loop and swingably confined in the separated openings 21, 22 while separation of the hooks 20 is being positively prevented by the washer 28 and lugs 29.

While the provision of a divided loop within the hooks as in FIGS. 2 to 6 inclusive may be desirable in order to prevent jamming of the connected links 15, it is not essential, and the chain hook assemblage may be formed as shown in FIGS. 7 and 8 with a single loop opening between the hooks. In this assemblage the two hook members 38 are swingably interconnected by a hollow pivot 39 and each of these members is provided with a hook 40 adapted to overlap the hook 40 of the other member and to provide a single loop opening 41. Each hook 40 of the modification has an inclined rectilinear edge 45 at one side and an inclined upstanding abutment 46 at its opposite side adapted to coact with the abutment 46 and edge 45, respectively, of the other hook 40 when these hooks are closed or overlapped, and in this embodiment one chain link 15 may be applied within the hollow pivot 39 while the adjacent link 15 of the chain 13 may be applied to the loop opening 41 so that the links will be spaced apart. When the chain 13 thus associated with the modified structure is subjected to pulling force, the assembling function as above described to positively prevent distortion and separation of the hooks 40 unless the force becomes excessive.

In the further modified chain hook assemblage shown in FIG. 9, the two S-shaped members 48 are swingably connected by a pivot 49 and each member has a pair of hooks 50, 51 formed thereon on opposite sides of the pivot pin of which the hook 50 of each member is adapted to overlap the hook 51 of the other member when these hooks are closed or overlapped. The hooks 50, 51 of each S-shaped member 48 cooperate with those of the other member to form separate chain link receiving loops when the hooks 50, 51 are closed or overlapped, and each hook of this modified assemblage is also provided with a straight inclined edge 55 on one side and with an oppositely inclined upstanding abutment 56 on its opposite side adapted to function as above described in order to reinforce and to prevent distortion of the hooks under normal loads or pulls applied to the chain.

From the foregoing detailed description, it will be apparent that the present invention in fact provides an improved chain hook assemblage which is simple and readily manipulable to reinforce the hooks under load and to prevent distortion and possible separation of the hooks when subjected to pulling forces of considerable magnitude. The spring washer 28 applied to the pivot 19 and the lugs 29 formed on the hooks insure positive overlapping of the hooks when closed, and the inclined side edges cooperate with the oppositely inclined lugs of the hooks to reinforce the latter and to prevent distortion and separation thereof under pull applied to the chain 13. The invention has gone into highly successful commercial operation, and it has been found that chain hook assemblages provided with the improved wedging action afforded by the cooperating side edges and abutments can resist far greater pulls than similar assemblages in which this feature is omitted.

Various modes of carrying out the invention are contemplated as being within the scope of the following claims particularly pointing out and distinctly claiming the subject matter which is regarded as the invention.

I claim:

1. A chain hook assemblage comprising, a pair of members having shank portions pivotally interconnected at one end with the opposite ends bent inwardly toward each other to form hooks swingable in parallel planes common to said hooks into overlapping position to provide a closed loop, the terminal portion of each of said hooks being formed with an external elongated rectilinear edge and each hook also being formed with an external elongated laterally off-set rectilinear abutment remote from its terminal portion and adjacent its shank portion, said rectilinear edges and said rectilinear abutment being inclined toward each other in a direction receding from said pivotal connection with the rectilinear abutment of one of said hooks forming a longitudinal bearing stop for the rectilinear edge of the other of said hooks when said hooks are swung to overlapped position to thus reinforce the terminal portions of said hooks.

2. A chain hook assemblage according to claim 1, wherein the shank portion of each of the members is provided with an internal medial projection cooperable to divide the loop into separate link receiving sockets when the loop is closed.

3. A chain hook assemblage according to claim 1, wherein the adjacent face of each hook is provided with a lug spaced equidistant from the pivotal connection and laterally offset from each other toward the terminal portion of its respective hook when the loop is closed whereby opening of the hooks is resisted.

References Cited in the file of this patent

UNITED STATES PATENTS

| 63,996 | Creuzbaur | Apr. 23, 1867 |
|---|---|---|
| 340,158 | Scott | Apr. 20, 1886 |
| 402,384 | Baker | Apr. 30, 1889 |
| 1,192,606 | Cornelius | July 25, 1916 |
| 1,353,134 | Shiffer et al. | Sept. 14, 1920 |
| 1,402,868 | King | Jan. 10, 1922 |